(12) United States Patent
Ramachandran et al.

(10) Patent No.: US 9,386,621 B2
(45) Date of Patent: Jul. 5, 2016

(54) SYSTEM AND METHOD OF IMPROVING CIRCUIT-SWITCHED FALLBACK PERFORMANCE

(75) Inventors: Shyamal Ramachandran, San Diego, CA (US); Thomas Klingenbrunn, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 834 days.

(21) Appl. No.: 13/231,759

(22) Filed: Sep. 13, 2011

(65) Prior Publication Data

US 2012/0064884 A1  Mar. 15, 2012

Related U.S. Application Data

(60) Provisional application No. 61/382,702, filed on Sep. 14, 2010, provisional application No. 61/382,706, filed on Sep. 14, 2010.

(51) Int. Cl.
*H04W 36/00* (2009.01)
*H04W 76/02* (2009.01)

(52) U.S. Cl.
CPC ........ *H04W 76/027* (2013.01); *H04W 36/0022* (2013.01)

(58) Field of Classification Search
CPC .................................................. H04W 36/00
USPC ......................................................... 455/436
See application file for complete search history.

(56) References Cited

U.S. PATENT DOCUMENTS 6,393,282 B1   5/2002  Iimori
8,526,953 B2 *  9/2013  Alanara et al. ................ 455/436
2008/0267128 A1  10/2008  Bennett et al.
2010/0113024 A1 *  5/2010  Wu .............................. 455/436
2010/0195568 A1 *  8/2010  Iimori .......................... 370/328
2010/0278142 A1  11/2010  Dwyer et al.

(Continued)

FOREIGN PATENT DOCUMENTS

CN    101731016 A    6/2010
JP    2000209630 A   7/2000

(Continued)

OTHER PUBLICATIONS

International Search Report and Written Opinion—PCT/US2011/051636—ISA/EPO—Jan. 16, 2012.

(Continued)

*Primary Examiner* — Huy C Ho
(74) *Attorney, Agent, or Firm* — Patterson & Sheridan, LLP

(57) ABSTRACT

Circuit-switched fallback (CSFB) is a technique to deliver voice-services to a mobile, when the mobile is camped in a long-term evolution (LTE) network. This may be required when the LTE network does not support voice services natively. If a user makes a mobile originating (MO) call, or receives a mobile terminating (MT) call, the UE may inform the LTE network that the UE is leaving for the call by initiating a call setup procedure. However, there may be instances where the call setup procedure may fail. If the call setup procedure was either not initiated, or was initiated but failed, the UE may determine to search for a suitable CS RAT/cell on its own without instructions/commands from the network. Therefore, certain aspects of the present disclosure provide techniques for the UE to find CS services based on information collected at the UE.

23 Claims, 8 Drawing Sheets

(56) References Cited

U.S. PATENT DOCUMENTS

| | | |
|---|---|---|
| 2010/0317378 A1 | 12/2010 | Fang et al. |
| 2011/0014919 A1 | 1/2011 | Otte et al. |
| 2011/0080894 A1 | 4/2011 | Iwamura et al. |

FOREIGN PATENT DOCUMENTS

| | | |
|---|---|---|
| JP | 2008035287 A | 2/2008 |
| JP | 2008507217 A | 3/2008 |
| JP | 2010056933 A | 3/2010 |
| JP | 2010178209 A | 8/2010 |
| WO | WO-2006020168 A2 | 2/2006 |
| WO | 2010146464 A1 | 12/2010 |

OTHER PUBLICATIONS

NTT DOCOMO: "GCF Priority 4—Addition of new test case 9.3.1.12a", 3GPP Draft; R5-104181R2, 3rd Generation Partnership Project (3GPP), Mobile Competence Centre ; 650, Route Des Lucioles ; F-06921 Sophia-Antipolis Cedex ; France, vol. RAN WG5, no. Madrid, Spain; 20100823, Aug. 25, 2010, XP050455595, [retrieved on Aug. 25, 2010].

Qualcomm Europe: "Avoiding ping-pong for CS/PS mode 1 UE in connected mode", 3GPP Draft; R2-093171, 3rd Generation Partnership Project (3GPP), Mobile Competence Centre ; 650, Route Des Lucioles ; F-06921 Sophi A-Anti Polis Cedex ; France, nu. San Francisco, USA; 20090427, Apr. 27, 2009, XP050340884, [retrieved on Apr. 27, 2009].

Invitation to Pay Additional Fees for PCT Application Serial No. PCT/US2011/051636 dated Nov. 7, 2011.

3rd Generation Partnership Project (3GPP), Technical Specification Group Services and System Aspects; Circuit Switched Fallback in Evolved Packet System; Stage 2 (Release 9), 3GPP TS 23.272, Dec. 2009, XP050400606, pp. 1-64.

Qualcomm Europe, Handling of Failure at Inter-RAT Redirection, R2-092037, 3rd Generation Partnership Project (3GPP), XP050339923, Seoul, Korea, Mar. 2009, 2 pages.

\* cited by examiner

SYSTEM AND METHOD OF IMPROVING CIRCUIT-SWITCHED FALLBACK PERFORMANCE

CROSS-REFERENCE TO RELATED APPLICATION

This application claims priority to U.S. Provisional Application Ser. Nos. 61/382,702 and 61/382,706, both filed on Sep. 14, 2010, which are expressly incorporated by reference herein in its entirety.

BACKGROUND

1. Field

Aspects of the present disclosure relate generally to wireless communications, and more particularly, to techniques for improving a circuit-switched fallback (CSFB) performance.

2. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include code division multiple access (CDMA) networks, time division multiple access (TDMA) networks, frequency division multiple access (FDMA) networks, orthogonal FDMA (OFDMA) networks, and single-carrier FDMA (SC-FDMA) networks.

A user equipment (UE) may be located within the coverage of multiple wireless networks, which may support different communication services. A suitable wireless network may be selected to serve the UE based on one or more criteria. The selected wireless network may be unable to provide a desired communication service (e.g., voice service) for the UE. A set of procedures may then be performed to redirect the UE to another wireless network that can provide the desired communication service.

SUMMARY

Certain aspects of the present disclosure provide a method for wireless communications at a user equipment (UE) capable of communicating via first and second radio access technologies (RATs). The method generally includes initiating a call setup procedure for leaving a first Node B of the first RAT for a call on the second RAT, searching for a second Node B of the second RAT for setting up the call using information collected at the UE, and performing network acquisition operations with the second Node B.

Certain aspects of the present disclosure provide an apparatus for wireless communications at a UE capable of communicating via first and second RATs. The apparatus generally includes means for initiating a call setup procedure for leaving a first Node B of the first RAT for a call on the second RAT, means for searching for a second Node B of the second RAT for setting up the call using information collected at the UE, and means for performing network acquisition operations with the second Node B.

Certain aspects of the present disclosure provide an apparatus for wireless communications at a UE capable of communicating via first and second RATs. The apparatus generally includes at least one processor configured to initiate a call setup procedure for leaving a first Node B of the first RAT for a call on the second RAT, search for a second Node B of the second RAT for setting up the call using information collected at the UE, perform network acquisition operations with the second Node B, and a memory coupled with the at least one processor.

Certain aspects of the present disclosure provide a computer-program product for wireless communications at a UE capable of communicating via first and second RATs. The computer-program product comprises a computer-readable medium having instructions stored thereon. The instructions are generally executable by one or more processors for initiating a call setup procedure for leaving a first Node B of the first RAT for a call on the second RAT, searching for a second Node B of the second RAT for setting up the call using information collected at the UE, and performing network acquisition operations with the second Node B.

Certain aspects of the present disclosure provide a method for wireless communications at a UE capable of communicating via first and second RATs. The method generally includes initiating a call setup procedure using the first RAT, determining that the call setup procedure failed, receiving an indication of a set period of time to wait before retrying the call setup procedure using the first RAT, and attempting the call setup procedure on the second RAT if the set period of time exceeds a threshold value.

Certain aspects of the present disclosure provide an apparatus for wireless communications at a UE capable of communicating via first and second RATs. The apparatus generally includes means for initiating a call setup procedure using the first RAT, means for determining that the call setup procedure failed, means for receiving an indication of a set period of time to wait before retrying the call setup procedure using the first RAT, and means for attempting the call setup procedure on the second RAT if the set period of time exceeds a threshold value.

Certain aspects of the present disclosure provide an apparatus for wireless communications at a UE capable of communicating via first and second RATs. The apparatus generally includes at least one processor configured to initiate a call setup procedure using the first RAT, determine that the call setup procedure failed, receive an indication of a set period of time to wait before retrying the call setup procedure using the first RAT, attempt the call setup procedure on the second RAT if the set period of time exceeds a threshold value, and a memory coupled with the at least one processor.

Certain aspects of the present disclosure provide a computer-program product for wireless communications at a UE capable of communicating via first and second RATs. The computer-program product comprises a computer-readable medium having instructions stored thereon. The instructions are generally executable by one or more processors for initiating a call setup procedure using the first RAT, determining that the call setup procedure failed, receiving an indication of a set period of time to wait before retrying the call setup procedure using the first RAT, and attempting the call setup procedure on the second RAT if the set period of time exceeds a threshold value.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Circuit-switched fallback (CSFB) is a technique to deliver voice-services to a mobile, when the mobile is camped in a long-term evolution (LTE) network. This may be required when the LTE network does not support voice services natively. If a user makes a mobile originating (MO) call, or receives a mobile terminating (MT) call, the UE may inform the LTE network that the UE is leaving for the call by initiating a call setup procedure. However, there may be instances where the call setup procedure may fail. For example, the UE may not be moved to the 1x network, or the UE may be moved to the 1x network but the call may fail there. If the call setup procedure was either not initiated, or was initiated but failed, the UE may determine to search for a suitable CS RAT/cell on its own without instructions/commands from the network. Therefore, certain aspects of the present disclosure provide techniques for the UE to find CS services based on information collected at the UE.

The techniques described herein may be used for various wireless communication networks such as code division multiple access (CDMA), time division multiple access (TDMA), frequency division multiple access (FDMA), orthogonal FDMA (OFDMA), single carrier FDMA (SC-FDMA) and other networks. The terms "network" and "system" are often used interchangeably. A CDMA network may implement a radio access technology (RAT) such as universal terrestrial radio access (UTRA), cdma2000, etc. UTRA includes wideband CDMA (WCDMA) and other variants of CDMA. cdma2000 covers IS-2000, IS-95 and IS-856 standards. IS-2000 is also referred to as 1x radio transmission technology (1xRTT), CDMA2000 1X, etc. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), IEEE 802.11 (Wi-Fi), IEEE 802.16 (WiMAX), IEEE 802.20, Flash-OFDM.RTM., etc. UTRA and E-UTRA are part of universal mobile telecommunication system (UMTS). 3GPP long-term evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and RATs mentioned above as well as other wireless networks and RATs.

Figure 1:
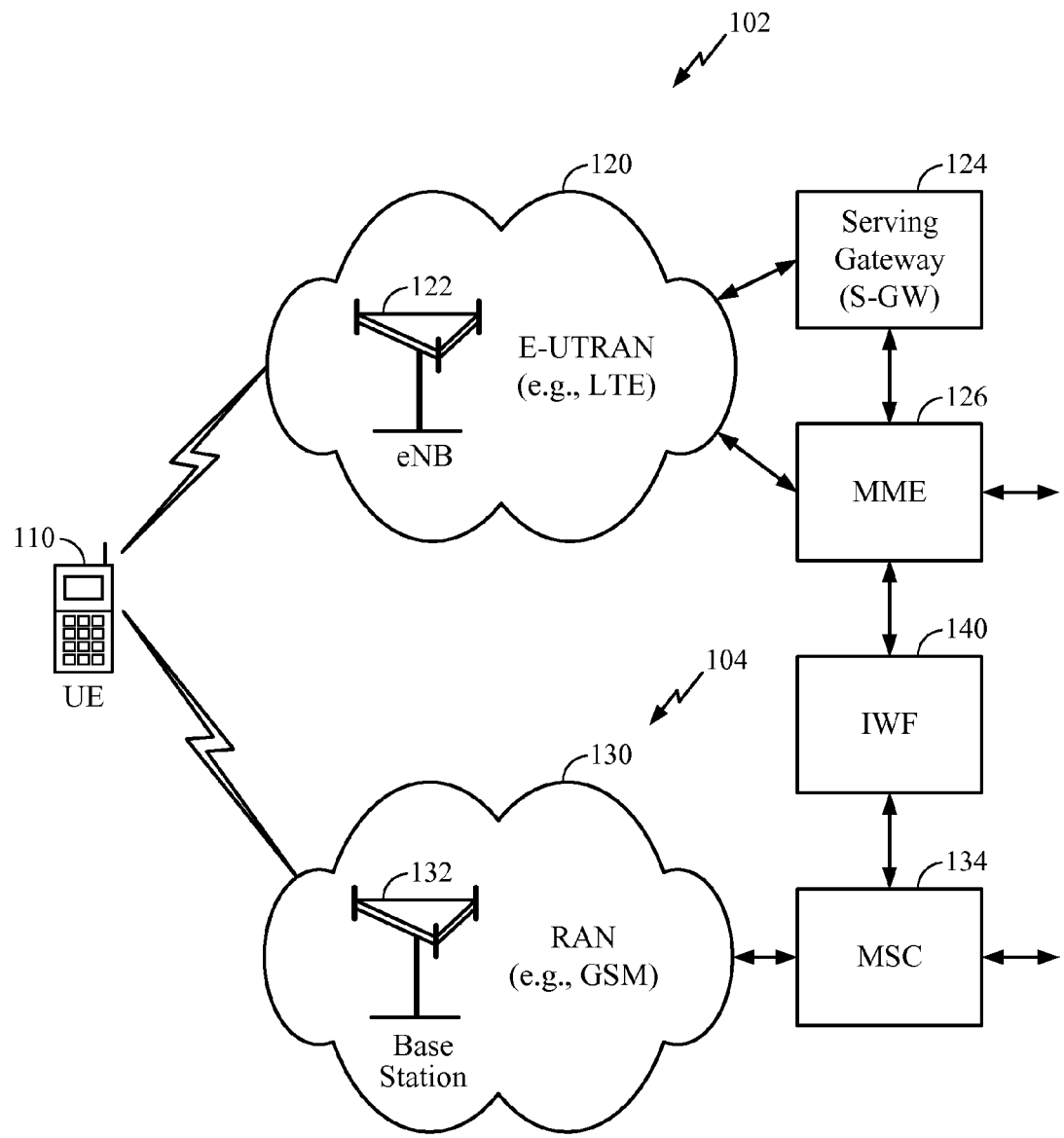
FIG. 1 illustrates an exemplary deployment in which multiple wireless networks have overlapping coverage.

FIG. 1 shows an exemplary deployment in which multiple wireless networks have overlapping coverage. An evolved universal terrestrial radio access network (E-UTRAN) 120 may support LTE and may include a number of evolved Node Bs (eNBs) 122 and other network entities that can support wireless communication for user equipments (UEs). Each eNB may provide communication coverage for a particular geographic area. The term "cell" can refer to a coverage area of an eNB and/or an eNB subsystem serving this coverage area. A serving gateway (S-GW) 124 may communicate with E-UTRAN 120 and may perform various functions such as packet routing and forwarding, mobility anchoring, packet buffering, initiation of network triggered services, etc. A mobility management entity (MME) 126 may communicate with E-UTRAN 120 and serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

A radio access network (RAN) 130 may support GSM and may include a number of base stations 132 and other network entities that can support wireless communication for UEs. A mobile switching center (MSC) 134 may communicate with the RAN 130 and may support voice services, provide routing for circuit-switched calls, and perform mobility management for UEs located within the area served by MSC 134. Optionally, an inter-working function (IWF) 140 may facilitate communication between MME 126 and MSC 134 (e.g., for 1xCSFB).

E-UTRAN 120, serving gateway 124, and MME 126 may be part of an LTE network 102. RAN 130 and MSC 134 may be part of a GSM network 104. For simplicity, FIG. 1 shows only some network entities in the LTE network 102 and the GSM network 104. The LTE and GSM networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

A UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc.

Upon power up, UE 110 may search for wireless networks from which it can receive communication services. If more than one wireless network is detected, then a wireless network with the highest priority may be selected to serve UE 110 and may be referred to as the serving network. UE 110 may perform registration with the serving network, if necessary. UE 110 may then operate in a connected mode to actively communicate with the serving network. Alternatively, UE 110 may operate in an idle mode and camp on the serving network if active communication is not required by UE 110.

UE 110 may be located within the coverage of cells of multiple frequencies and/or multiple RATs while in the idle mode. For LTE, UE 110 may select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may also be used for GSM and may have medium priority. In general, the priority list may include any number of frequencies for any set of RATs and may be specific for the UE location. UE 110 may be configured to prefer LTE, when available, by defining the priority list with LTE frequencies at the highest priority and with frequencies for other RATs at lower priorities, e.g., as given by the example above.

UE 110 may operate in the idle mode as follows. UE 110 may identify all frequencies/RATs on which it is able to find a "suitable" cell in a normal scenario or an "acceptable" cell in an emergency scenario, where "suitable" and "acceptable" are specified in the LTE standards. UE 110 may then camp on the frequency/RAT with the highest priority among all identified frequencies/RATs. UE 110 may remain camped on this frequency/RAT until either (i) the frequency/RAT is no longer available at a predetermined threshold or (ii) another frequency/RAT with a higher priority reaches this threshold. This operating behavior for UE 110 in the idle mode is described in 3GPP TS 36.304, entitled "Evolved Universal Terrestrial Radio Access (E-UTRA); User Equipment (UE) procedures in idle mode," which is publicly available.

UE 110 may be able to receive packet-switched (PS) data services from LTE network 102 and may camp on the LTE network while in the idle mode. LTE network 102 may have limited or no support for voice-over-Internet protocol (VoIP), which may often be the case for early deployments of LTE networks. Due to the limited VoIP support, UE 110 may be transferred to another wireless network of another RAT for voice calls. This transfer may be referred to as circuit-switched (CS) fallback. UE 110 may be transferred to a RAT that can support voice service such as 1xRTT, WCDMA, GSM, etc. For call origination with CS fallback, UE 110 may initially become connected to a wireless network of a source RAT (e.g., LTE) that may not support voice service. The UE may originate a voice call with this wireless network and may be transferred through higher-layer signaling to another wireless network of a target RAT that can support the voice call. The higher-layer signaling to transfer the UE to the target RAT may be for various procedures, e.g., connection release with redirection, PS handover, etc.

Figure 2:
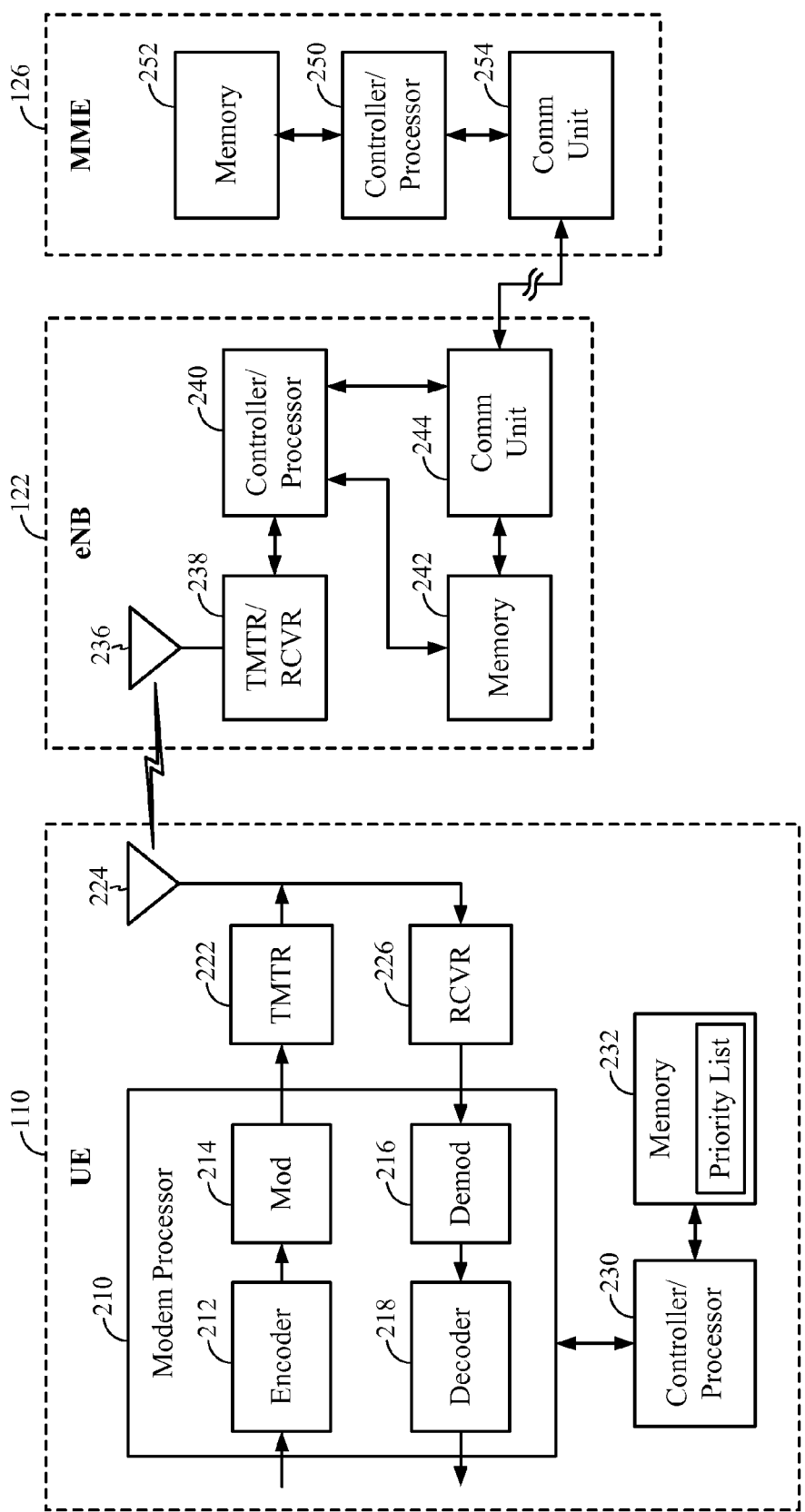
FIG. 2 illustrates a block diagram of a user equipment (UE) and other network entities.

FIG. 2 shows a block diagram of a design of UE 110, eNB 122, and MME 126 in FIG. 1. At UE 110, an encoder 212 may receive traffic data and signaling messages to be sent on the uplink. Encoder 212 may process (e.g., format, encode, and interleave) the traffic data and signaling messages. A modulator (Mod) 214 may further process (e.g., symbol map and modulate) the encoded traffic data and signaling messages and provide output samples. A transmitter (TMTR) 222 may condition (e.g., convert to analog, filter, amplify, and frequency upconvert) the output samples and generate an uplink signal, which may be transmitted via an antenna 224 to eNB 122.

On the downlink, antenna 224 may receive downlink signals transmitted by eNB 122 and/or other eNBs/base stations. A receiver (RCVR) 226 may condition (e.g., filter, amplify, frequency downconvert, and digitize) the received signal from antenna 224 and provide input samples. A demodulator (Demod) 216 may process (e.g., demodulate) the input samples and provide symbol estimates. A decoder 218 may process (e.g., deinterleave and decode) the symbol estimates and provide decoded data and signaling messages sent to UE 110. Encoder 212, modulator 214, demodulator 216, and decoder 218 may be implemented by a modem processor 210. These units may perform processing in accordance with the RAT (e.g., LTE, 1xRTT, etc.) used by the wireless network with which UE 110 is in communication.

A controller/processor 230 may direct the operation at UE 110. Controller/processor 230 may also perform or direct other processes for the techniques described herein. Controller/processor 230 may also perform or direct the processing by UE 110 in FIGS. 3 and 4. Memory 232 may store program codes and data for UE 110. Memory 232 may also store a priority list and configuration information.

At eNB 122, a transmitter/receiver 238 may support radio communication with UE 110 and other UEs. A controller/processor 240 may perform various functions for communication with the UEs. On the uplink, the uplink signal from UE 110 may be received via an antenna 236, conditioned by receiver 238, and further processed by controller/processor 240 to recover the traffic data and signaling messages sent by UE 110. On the downlink, traffic data and signaling messages may be processed by controller/processor 240 and conditioned by transmitter 238 to generate a downlink signal, which may be transmitted via antenna 236 to UE 110 and other UEs. Controller/processor 240 may also perform or direct other processes for the techniques described herein. Controller/processor 240 may also perform or direct the processing by eNB 122 in FIGS. 3 and 4. Memory 242 may store program codes and data for the base station. A communication (Comm) unit 244 may support communication with MME 126 and/or other network entities.

At MME 126, a controller/processor 250 may perform various functions to support communication services for UEs. Controller/processor 250 may also perform or direct the processing by MME 126 in FIGS. 3 and 4. Memory 252 may store program codes and data for MME 126. A communication unit 254 may support communication with other network entities.

FIG. 2 shows simplified designs of UE 110, eNB 122, and MME 126. In general, each entity may include any number of transmitters, receivers, processors, controllers, memories, communication units, etc. Other network entities may also be implemented in similar manner.

Figure 3:
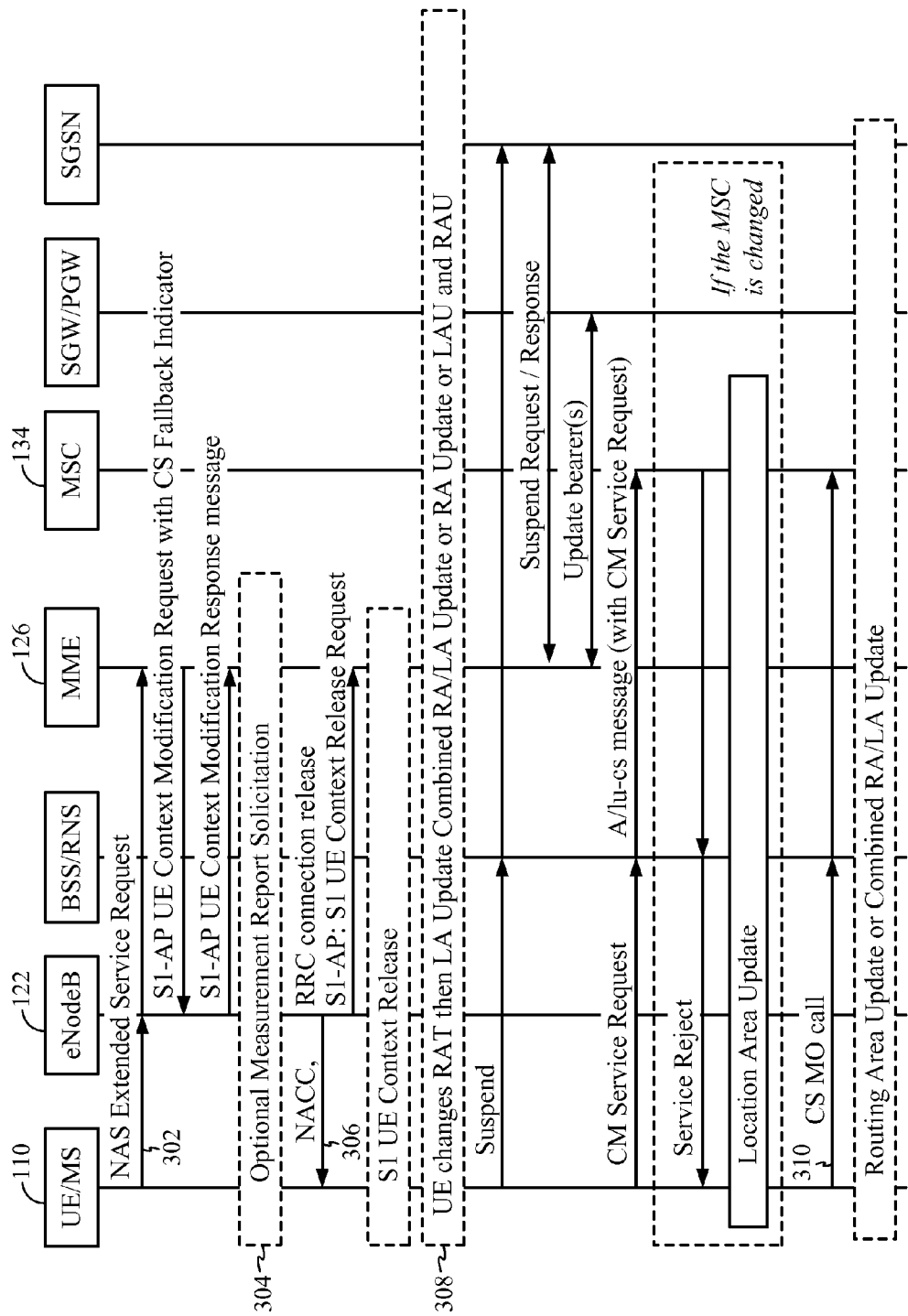
FIG. 3 illustrates an example call flow of circuit-switched fallback (CSFB) when a UE makes a mobile originating (MO) call, according to certain aspects of the present disclosure.

FIG. 3 illustrates an example call flow of CSFB when a UE 110 makes a mobile originating (MO) call, according to certain aspects of the present disclosure. While the UE 110 is camped on an LTE network (eNB 122) that may not support voice services, the UE 110 may need to fallback to a GSM/UMTS network connected to the MSC 134 in order to make the MO call. The call setup procedure may begin at 302 where the UE 110 may send a non access stratum (NAS) extended service request (ESR) to the MME 126. The ESR may comprise a CSFB indicator that informs the MME 126 to perform CSFB. In response to the ESR, the MME 126 may indicate to the eNB 122 that the UE 110 should be moved to a GSM/UMTS network.

At 304, the eNB 122 may receive a measurement report from the UE 110 to determine CS RAT candidates to which the redirection procedure may be performed. At 306, the LTE network may assist the UE 110 in the mobility procedure (e.g., redirection, handover, or network assisted cell change (NACC)). For example, if an interface between the MSC 134 and the MME 126 is down, the LTE network may inform the UE 110 to retry the call setup after a set period of time. For some embodiments, the eNB 122 may trigger an inter-RAT cell change order with the NACC to a GSM cell by sending an RRC message to the UE 110. The inter-RAT cell change order may contain a CSFB indicator that indicates to the UE 110 that the cell change order is triggered due to a CSFB request.

At 308, the UE 110 may move to the new GSM cell, using, for example, the NACC information and establishing the radio signaling connection. At 310, the UE may initiate the CS MO call.

Figure 4:
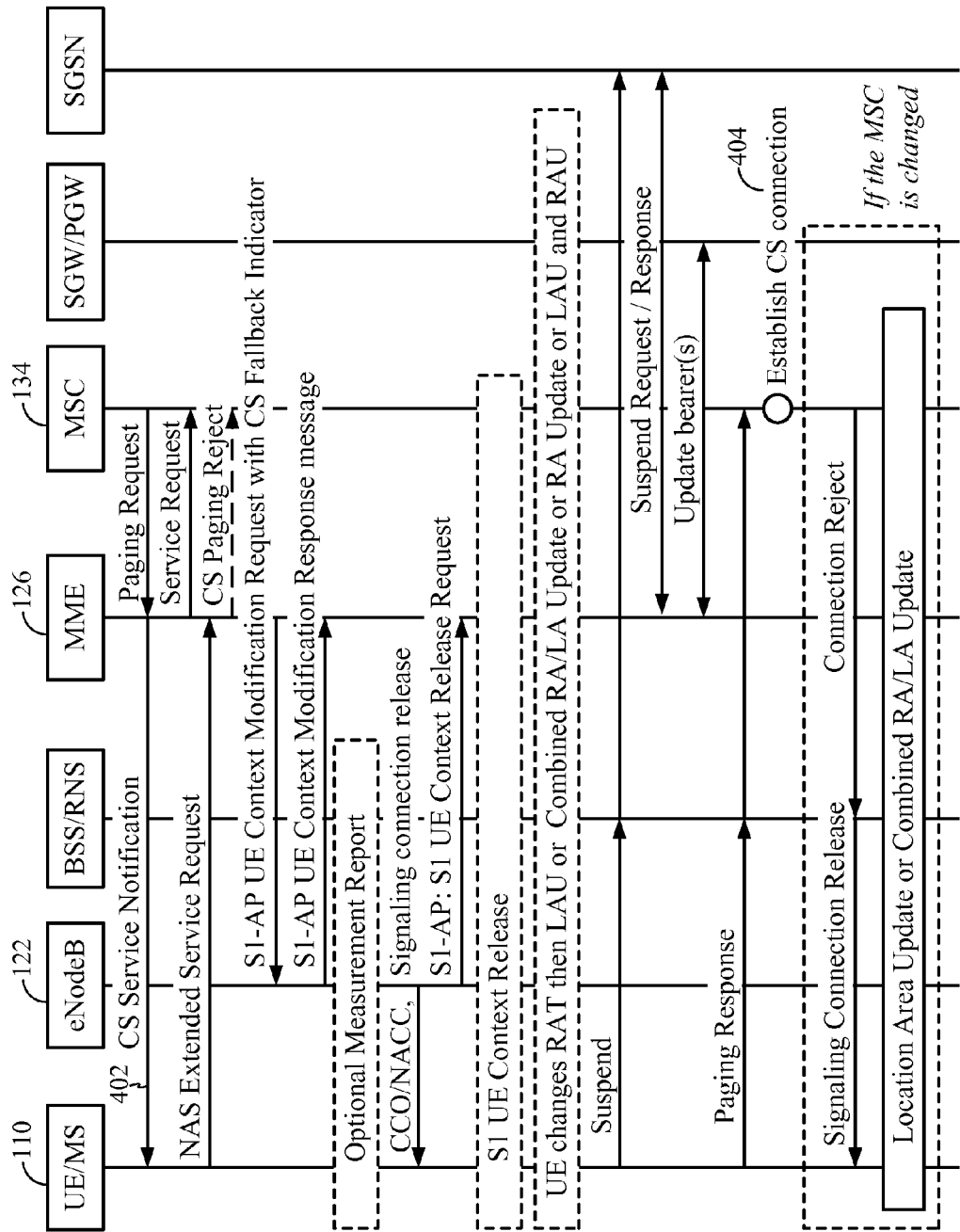
FIG. 4 illustrates an example call flow of CSFB when a UE receives a mobile terminating (MT) call, according to certain aspects of the present disclosure.

FIG. 4 illustrates an example call flow of CSFB when a UE 110 receives a mobile terminating (MT) call, according to certain aspects of the present disclosure. Operations may be similar to those described in FIG. 3, however, the UE 110 may initiate the call setup procedure after receiving a GSM/UMTS page at 402 (e.g., CS SERVICE NOTIFICATION). For example, the MSC 134 may receive an incoming voice call and respond by sending a paging request to the MME 126. The eNB 122 may forward the paging message to the UE 110. At 404, if the UE 110 is registered in the MSC 134 serving a GSM/UMTS cell, the MSC 134 may establish the CS MT call.

SYSTEM AND METHOD OF IMPROVING CIRCUIT-SWITCHED FALLBACK PERFORMANCE

For some embodiments, when a user dials a number to place a CS call (MO call), if the UE were camped on an LTE network, the CSFB procedure may be employed, as illustrated in FIG. 3. This procedure may move the UE from the LTE network to another network (e.g., UTRAN/GERAN/1xRTT) where CS call setup may occur using legacy CS call setup procedures. Moving the UE from the LTE network to the other network may require the network to use mobility procedures such as redirection, handover, or NACC (e.g., as illustrated in FIG. 3 at 306). If the call setup procedure succeeds, the UE may find itself on the correct target cell and may be able to place the CS call. However, if these mobility procedures were either not initiated, or were initiated but failed, the UE may determine to search for a suitable CS RAT/cell on its own without instructions/commands from the network.

However, in the absence of a mobility command from the network, the UE may not know which target RAT/band/channel the UE may need to tune to in order to find CS services and in order to be able to continue with the CSFB procedure (i.e., continue with CS call setup). If the UE must look for a CS service/RAT without any help from the network, the CS call setup procedure may be delayed or may completely fail.

For some embodiments, the UE may maximize the chances of finding CS services based on information the UE may already have obtained. After the UE initiates the CSFB procedure, if the UE is not moved by the network to a CS RAT, or if the network attempts to move the UE but the UE fails to acquire the target cell, the UE may use information that the UE may already have collected, as will be discussed further below. For some embodiments, the information may be used in a particular order that optimizes scanning for CS services by the UE upon a CSFB procedure failure.

Figure 5:
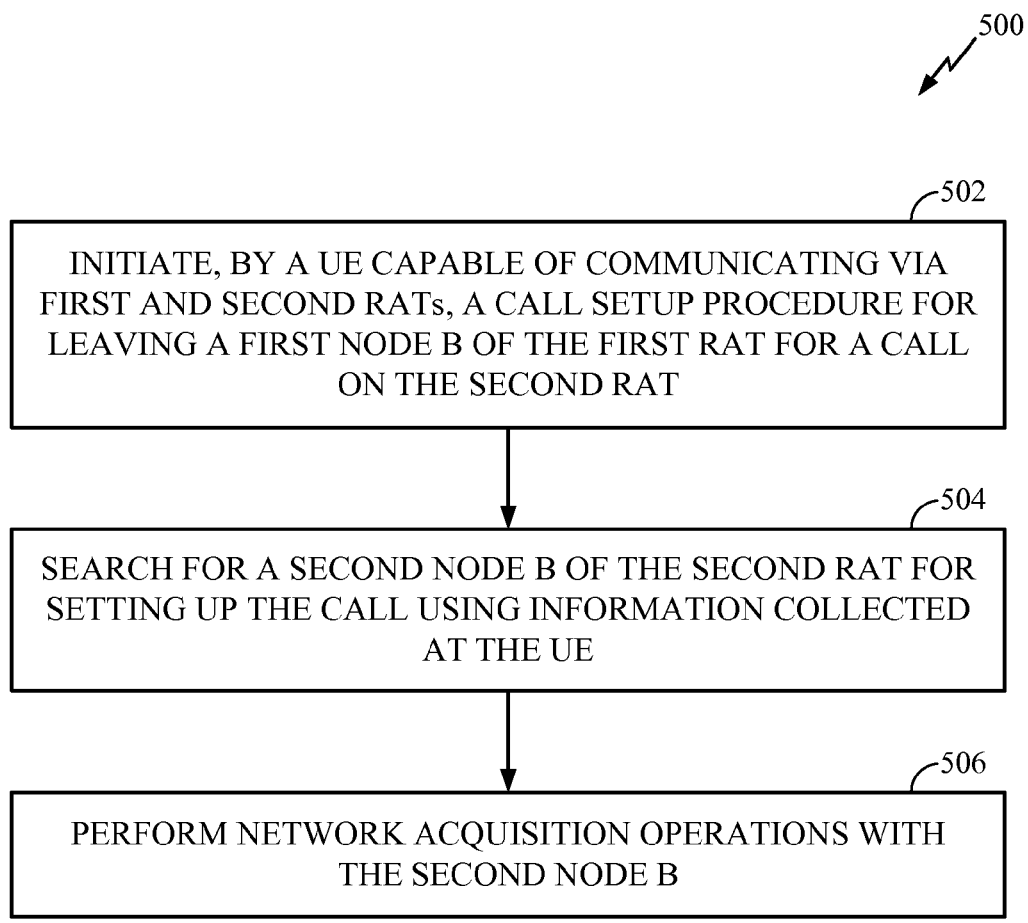
FIG. 5 illustrates example operations for performing CSFB to a network for a CS voice call setup, in accordance with certain aspects of the present disclosure.

FIG. 5 illustrates example operations 500 for performing CSFB to a network for a CS voice call setup, in accordance with certain aspects of the present disclosure. The operations 500 may be performed, for example, by a UE capable of communicating via first and second RATs. At 502, the UE may initiate a call setup procedure for leaving a first Node B of the first RAT (e.g., LTE) for a call on the second RAT (e.g., a CDMA RAT, a UMTS RAT, or a GSM RAT).

At 504, the UE may search for a second Node B of the second RAT for setting up the call using information collected at the UE. For some embodiments, the information may comprise candidates from measurement objects received from the first Node B (e.g., an LTE eNB). For example, if the UE received a mobility command from the LTE network (e.g., at 306 in FIG. 3), the UE may first use information indicating the target RAT/band/channel the UE may need to tune to in order to find CS services and in order to continue with the call setup procedure. As another example, the UE may use information relating to CS RAT candidates from the most recently received/maintained measurement objects received from the LTE eNB (e.g., at 304 in FIG. 3). If multiple candidates qualify, the candidates may be considered in the order most recently received to the oldest received.

For some embodiments, the information may comprise a neighbor list received from the first Node B, wherein the neighbor list comprises Node Bs associated with the second RAT. The neighbor list may comprise Node Bs listed in SIB6 (e.g., UTRAN), SIB7 (e.g., GERAN), or SIB8 (e.g., 1xRTT). If multiple neighbors qualify, the neighbors may be considered in the order of RAT/channel priority included in the SIBs.

For some embodiments, the information may comprise channels on which Node Bs associated with the second RAT were most recently acquired. In other words, if the UE did not receive any information from the LTE network, the UE may search channels on which CS RATs were most recently acquired by the UE (i.e., UE history).

For some embodiments, the information may comprise all unscanned channels in an order specified by system selection databases. Therefore, the UE may search all unscanned CS bands/channels in the order specified by the system selection databases.

For some embodiments, the searching described above at 504 may comprise using the information collected at the UE in a particular order. For example, searching for the second Node B of the second RAT may comprise using the information in the order described above. At 506, the UE may perform network acquisition operations with the second Node B.

Figure 5A:
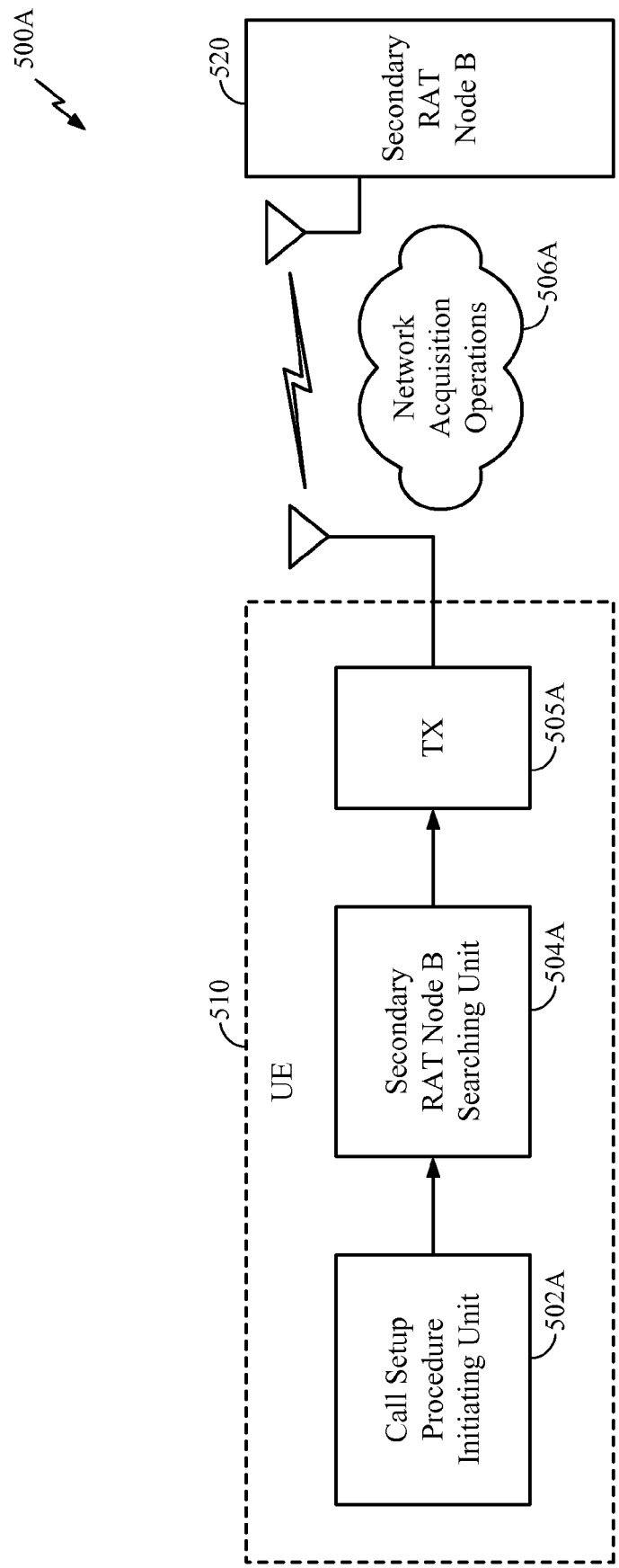
FIG. 5A illustrates example components capable of performing the operations illustrated in FIG. 5.

The operations 500 described above may be performed by any suitable components or other means capable of performing the corresponding functions of FIG. 5. For example, operations 500 illustrated in FIG. 5 correspond to components 500A illustrated in FIG. 5A, comprising a UE 510 capable of communicating via first and second RATs. In FIG. 5A, a call setup procedure initiating unit 502A may initiate a call setup procedure for leaving a first Node B of the first RAT (e.g., LTE) for a call on the second RAT (e.g., a CDMA RAT or a GSM RAT). A secondary RAT Node B searching unit 504A may search for a second Node B 520 of the second RAT for setting up the call using information collected at the UE. A transmitter 505A may perform network acquisition operations 506A with the second Node B 520.

The CSFB procedure may require the UE to initiate a 3GPP NAS Extended Service Request (ESR) procedure, as described above (e.g., at 302 of FIG. 3). The ESR procedure may be required to succeed for the CSFB procedure to continue normally. For some embodiments, the ESR procedure may fail if the CS domain is temporarily unavailable. For example, if an interface between an MSC and an MME is out of service, the LTE network may inform the UE. Further, the LTE MME may inform the UE that the CS domain is unavailable and may instruct the UE to retry the ESR procedure on the LTE network after a period of time. For some embodiments, the period of time may be determined by a network-configured programmable timer. If the period of time is long, the user experience may be poor and the CS call may fail.

For some embodiments, the UE may maintain a configurable parameter timer (e.g., a threshold timer). The threshold timer, for example, may be adjustable by a user of the UE, configured over-the-air (OTA), set by the manufacturer of the UE, or set by the operator of the network. If the ESR procedure initiated by the UE fails with the network informing that CS services are temporarily unavailable, the UE may determine whether to retry the ESR procedure after comparing the period of time determined by the network-configured programmable timer with a threshold value determined by the threshold timer.

For example, if the period of time for which the UE is not allowed to retry ESR is greater than the threshold value, the UE may determine to leave the LTE network and search for the service of a CS RAT on its own without instructions/commands from the network, as described above (e.g., with reference to FIG. 5). However, if the period of time for which the UE is not allowed to retry ESR is less than or equal to the threshold value, the UE may determine to stay on the LTE network and retry the ESR procedure after expiration the period of time. For some embodiments, for MO calls, the user may be given a "call in progress" indication before the expiration of the period of time.

Figure 6:
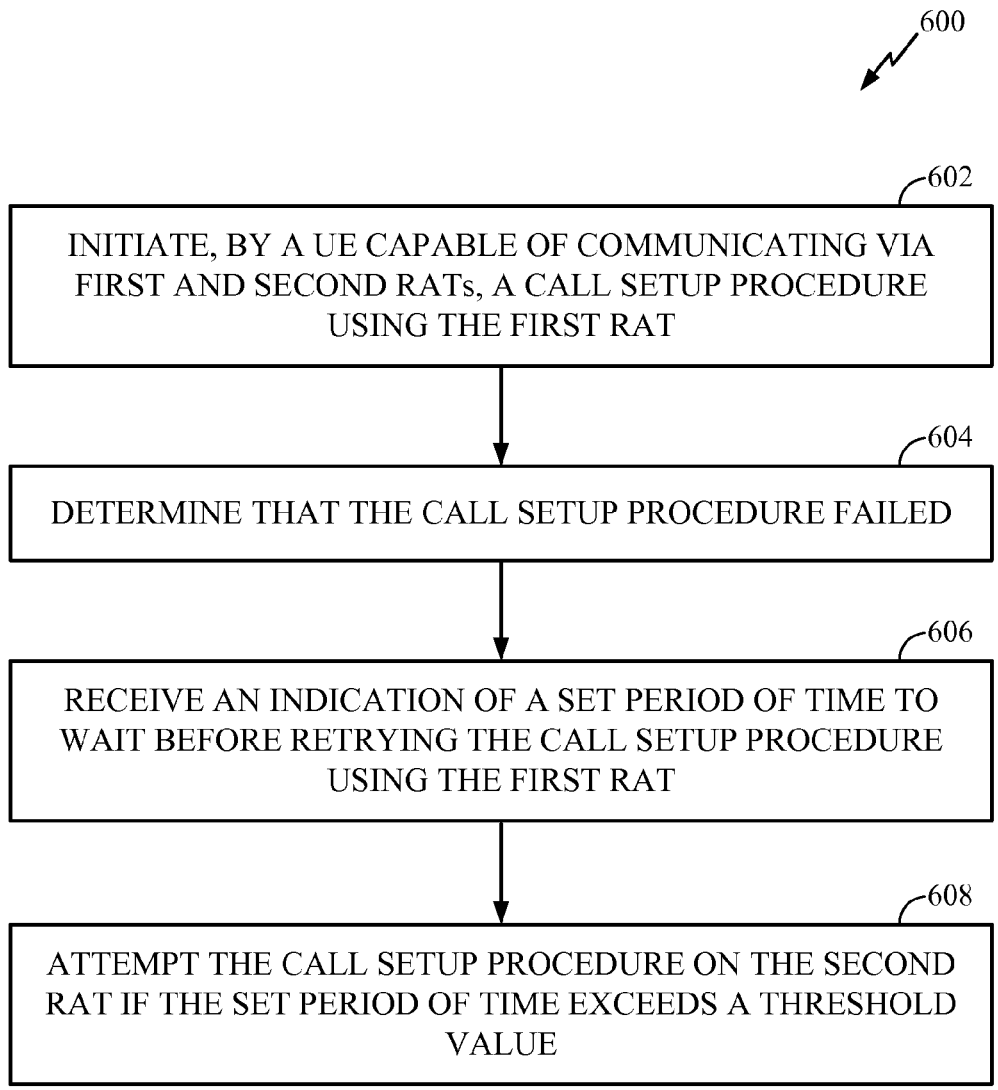
FIG. 6 illustrates example operations for determining whether to retry a call setup procedure, in accordance with certain aspects of the present disclosure.

FIG. 6 illustrates example operations 600 for determining whether to retry a call setup procedure (e.g., ESR procedure), in accordance with certain aspects of the present disclosure. The operations 600 may be performed, for example, by a UE capable of communicating via first and second RATs. At 602, the UE may initiate a call setup procedure using the first RAT. The call setup procedure may be for leaving a first Node B of the first RAT for a call on the second RAT.

At 604, the UE may determine that the call setup procedure failed. For some embodiments, the UE may receive an indication that the call setup procedure failed due to unavailability of services utilized for the call setup procedure in the first RAT. At 606, the UE may receive an indication of a set period of time to wait before retrying the call setup procedure using the first RAT.

At 608, the UE may attempt the call setup procedure on the second RAT if the set period of time exceeds a threshold value. For example, the UE may search for a second Node B of the second RAT for setting up the call using information collected at the UE, and perform network acquisition operations with the second Node B, as described above.

However, if the set period of time is less than or equal to the threshold value, the UE may retry the call setup procedure using the first RAT after the set period of time has elapsed. For some embodiments, the UE may receive a "call in progress" indication before the set period of time has elapsed.

Figure 6A:
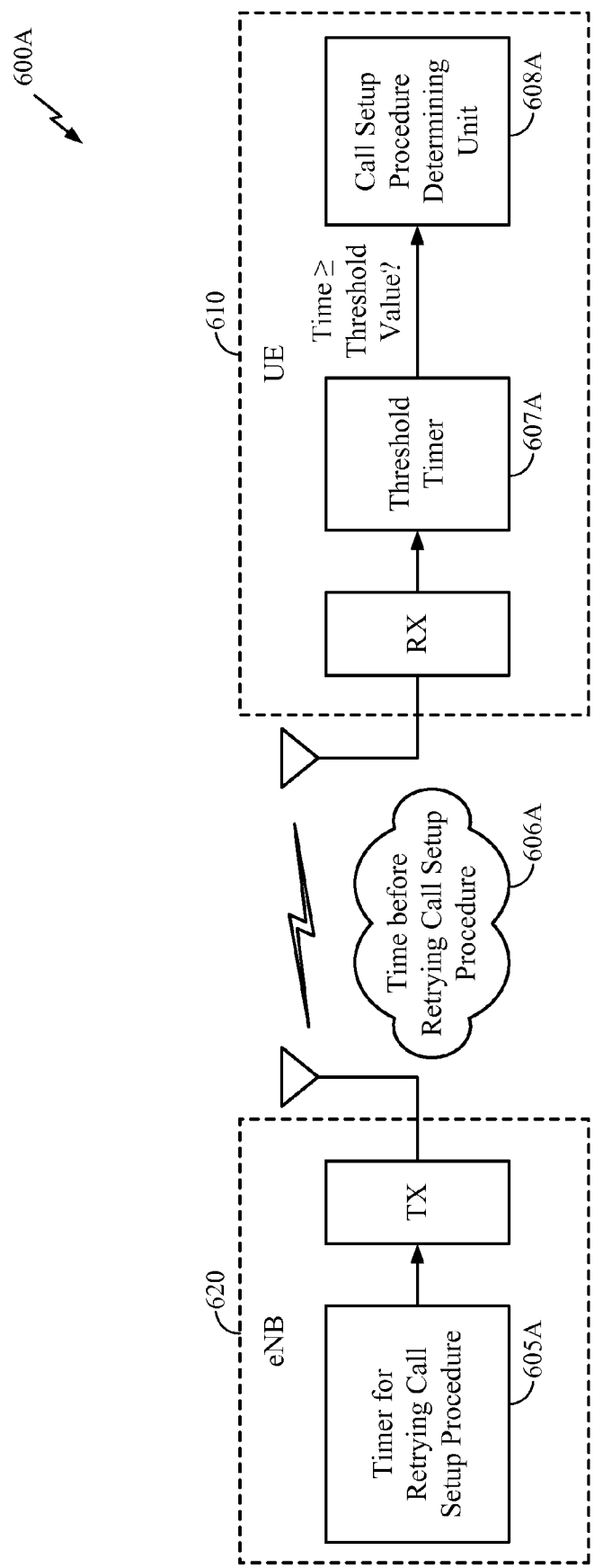
FIG. 6A illustrates example components capable of performing the operations illustrated in FIG. 6.

The operations 600 described above may be performed by any suitable components or other means capable of performing the corresponding functions of FIG. 6. For example, operations 600 illustrated in FIG. 6 correspond to components 600A illustrated in FIG. 6A, comprising a UE 610 capable of communicating via first and second RATs. In FIG. 6A, after determining that a call setup procedure has failed, the UE 610 may receive an indication of a set period of time 606A to wait before retrying the call setup procedure using the first RAT. The period of time 606A may be determined at an eNB 620 by a network-configured programmable timer 605A. The UE 610 may comprise a threshold timer 607A for determining a threshold value to compare with the period of time 606A. A call setup procedure determining unit 608A may determine whether to retry the call setup procedure after comparing the period of time 606A with the threshold value.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications at a user equipment (UE) capable of communicating via first and second radio access technologies (RATs), the method comprising:
    initiating a call setup procedure for leaving a first Node B of the first RAT for a call on the second RAT;
    searching for a second Node B of the second RAT for setting up the call using information collected at the UE, wherein the information comprises channels on which Node Bs associated with the second RAT were most recently acquired by the UE and all unscanned channels to be scanned in an order specified by system selection databases, wherein the information is used in a predefined order, wherein the predefined order comprises searching the channels on which the Node Bs associated with the second RAT were most recently acquired by the UE prior to searching all the unscanned channels in the order specified by the system selection databases, and wherein the searching is performed in absence of a mobility command from the first RAT; and
    performing network acquisition operations with the second Node B.

2. The method of claim 1, wherein the first RAT comprises Long-Term Evolution (LTE).

3. The method of claim 1, wherein the second RAT comprises at least one of a Code Division Multiple Access (CDMA) RAT, a Global System for Mobile (GSM) RAT, and a Universal Mobile Telecommunication System (UMTS) RAT.

4. The method of claim 1, wherein the information further comprises candidates from measurement objects received from the first Node B.

5. The method of claim 1, wherein the information further comprises a neighbor list received from the first Node B, wherein the neighbor list comprises Node Bs associated with the second RAT.

6. The method of claim 5, wherein the neighbor list comprises Node Bs listed in SIB6 (System Information Block) (UTRAN) (Universal Terrestrial Radio Access Network), SIB7 (System Information Block) (GERAN) (GSM EDGE Radio Access Network), or SIB8 (System Information Block) (1xRTT) (1xRadio Transmission Technology).

7. The method of claim 1, wherein using the information in the predefined order comprises:
    using candidates from measurement objects received from the first Node B;
    after using the candidates from the measurement objects, using a neighbor list received from the first Node B, wherein the neighbor list comprises Node Bs associated with the second RAT, and wherein the neighbor list comprises Node Bs listed in SIB6 (System Information Block) (UTRAN) (Universal Terrestrial Radio Access Network), SIB7 (System Information Block) (GERAN) (GSM EDGE Radio Access Network), or SIB8 (System Information Block) (1xRTT) (1xRadio Transmission Technology);
    after using the neighbor list, using the channels on which the Node Bs associated with the second RAT were most recently acquired by the UE; and
    after using the channels, using all the unscanned channels in the order specified by the system selection databases.

8. The method of claim 7, wherein using the candidates from measurement objects received from the first Node B further comprises using the candidates in an order of most recently received candidate to oldest received candidate.

9. The method of claim 7, wherein after using the candidates from the measurement objects, using the neighbor list further comprises using the Node Bs associated with the second RAT in an order of priority as specified by the SIB6 (System Information Block) (UTRAN) (Universal Terrestrial Radio Access Network) , SIB7 (System Information Block) (GERAN) (GSM EDGE Radio Access Network), or SIB8 (System Information Block) (1xRTT) (1xRadio Transmission Technology).

10. An apparatus for wireless communications at a user equipment (UE) capable of communicating via first and second radio access technologies (RATs), comprising:
    means for initiating a call setup procedure for leaving a first Node B of the first RAT for a call on the second RAT;
    means for searching for a second Node B of the second RAT for setting up the call using information collected at the UE, wherein the information comprises channels on which Node Bs associated with the second RAT were most recently acquired by the UE and all unscanned channels to be scanned in an order specified by system selection databases, wherein the information is used in a predefined order, wherein the predefined order comprises searching the channels on which the Node Bs associated with the second RAT were most recently acquired by the UE prior to searching all the unscanned channels in the order specified by the system selection databases, and wherein the means for searching searches in absence of a mobility command from the first RAT; and
    means for performing network acquisition operations with the second Node B.

11. The apparatus of claim 10, wherein the first RAT comprises Long-Term Evolution (LTE).

12. The apparatus of claim 10, wherein the second RAT comprises at least one of a Code Division Multiple Access (CDMA) RAT, a Global System for Mobile (GSM) RAT, and a Universal Mobile Telecommunication System (UMTS) RAT.

13. The apparatus of claim 10, wherein the information further comprises candidates from measurement objects received from the first Node B.

14. The apparatus of claim 10, wherein the information further comprises a neighbor list received from the first Node B, wherein the neighbor list comprises Node Bs associated with the second RAT.

15. The apparatus of claim 14, wherein the neighbor list comprises Node Bs listed in SIB6 (System Information Block) (UTRAN) (Universal Terrestrial Radio Access Network:), SIB7 (System Information Block) (GERAN) (GSM EDGE Radio Access Network), or SIB8 (System Information Block) (1xRTT) (1xRadio Transmission Technology).

16. An apparatus for wireless communications at a user equipment (UE) capable of communicating via first and second radio access technologies (RATs), comprising:
at least one processor configured to:
initiate a call setup procedure for leaving a first Node B of the first RAT for a call on the second RAT;
search for a second Node B of the second RAT for setting up the call using information collected at the UE, wherein the information comprises channels on which Node Bs associated with the second RAT were most recently acquired by the UE and all unscanned channels to be scanned in an order specified by system selection databases, wherein the information is used in a predefined order, wherein the predefined order comprises searching the channels on which the Node Bs associated with the second RAT were most recently acquired by the UE prior to searching all the unscanned channels in the order specified by the system selection databases, and wherein the search is performed in absence of a mobility command from the first RAT; and
perform network acquisition operations with the second Node B; and
a memory coupled with the at least one processor.

17. The apparatus of claim 16, wherein the information further comprises candidates from measurement objects received from the first Node B.

18. The apparatus of claim 16, wherein the information further comprises a neighbor list received from the first Node B, wherein the neighbor list comprises Node Bs associated with the second RAT.

19. The apparatus of claim 18, wherein the neighbor list comprises Node Bs listed in SIB6 (System Information Block) (UTRAN) (Universal Terrestrial Radio Access Network), SIB7 (System Information Block) (GERAN) (GSM EDGE Radio Access Network), or SIB8 (System Information Block) (1xRTT) (1xRadio Transmission Technology).

20. A non-transitory computer-readable medium for wireless communications at a user equipment (UE) capable of communicating via first and second radio access technologies (RATs), the non-transitory computer-readable medium having instructions stored thereon, the instructions executable by one or more processors for:
initiating a call setup procedure for leaving a first Node B of the first RAT for a call on the second RAT;
searching for a second Node B of the second RAT for setting up the call using information collected at the UE, wherein the information comprises channels on which Node Bs associated with the second RAT were most recently acquired by the UE and all unscanned channels to be scanned in an order specified by system selection databases, wherein the information is used in a predefined order, wherein the predefined order comprises searching the channels on which the Node Bs associated with the second RAT were most recently acquired by the UE prior to searching all the unscanned channels in the order specified by the system selection databases, and wherein the searching is performed in absence of a mobility command from the first RAT; and
performing network acquisition operations with the second Node B.

21. The non-transitory computer-readable medium of claim 20, wherein the information further comprises candidates from measurement objects received from the first Node B.

22. The non-transitory computer-readable medium of claim 20, wherein the information further comprises a neighbor list received from the first Node B, wherein the neighbor list comprises Node Bs associated with the second RAT.

23. The non-transitory computer readable medium of claim 22, wherein the neighbor list comprises Node Bs listed in SIB6 (System Information Block) (UTRAN) (Universal Terrestrial Radio Access Network) , SIB7 (System Information Block) (GERAN) (GSM EDGE Radio Access Network), or SIB8 (System Information Block) (1xRTT) (1xRadio Transmission Technology).

* * * * *